May 16, 1944.  K. L. FINLEY ET AL  2,349,155
FLAT DISK VALVE
Filed May 13, 1942  2 Sheets-Sheet 2
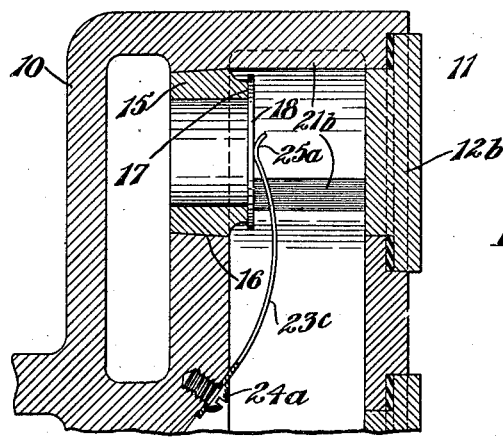
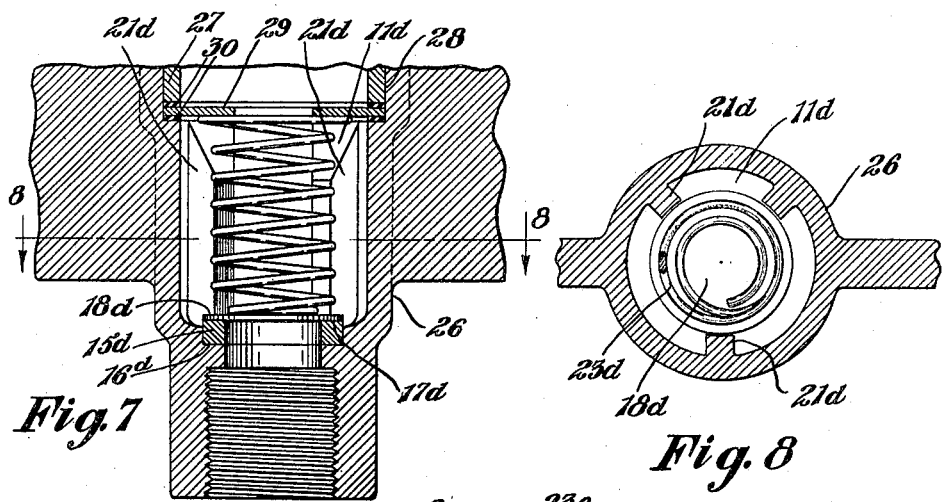
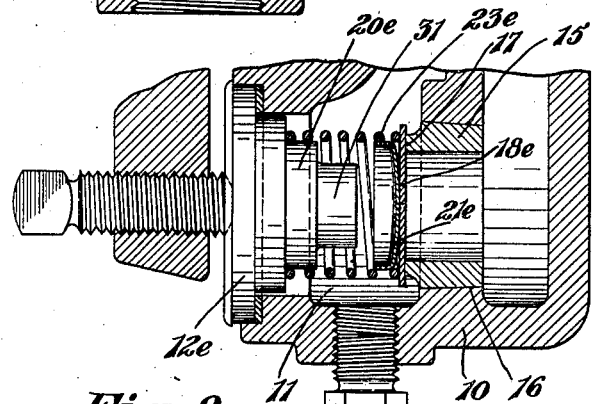
Inventors
Karl L. Finley
Donald D. Smith
and Warren M. Spreng Patented May 16, 1944

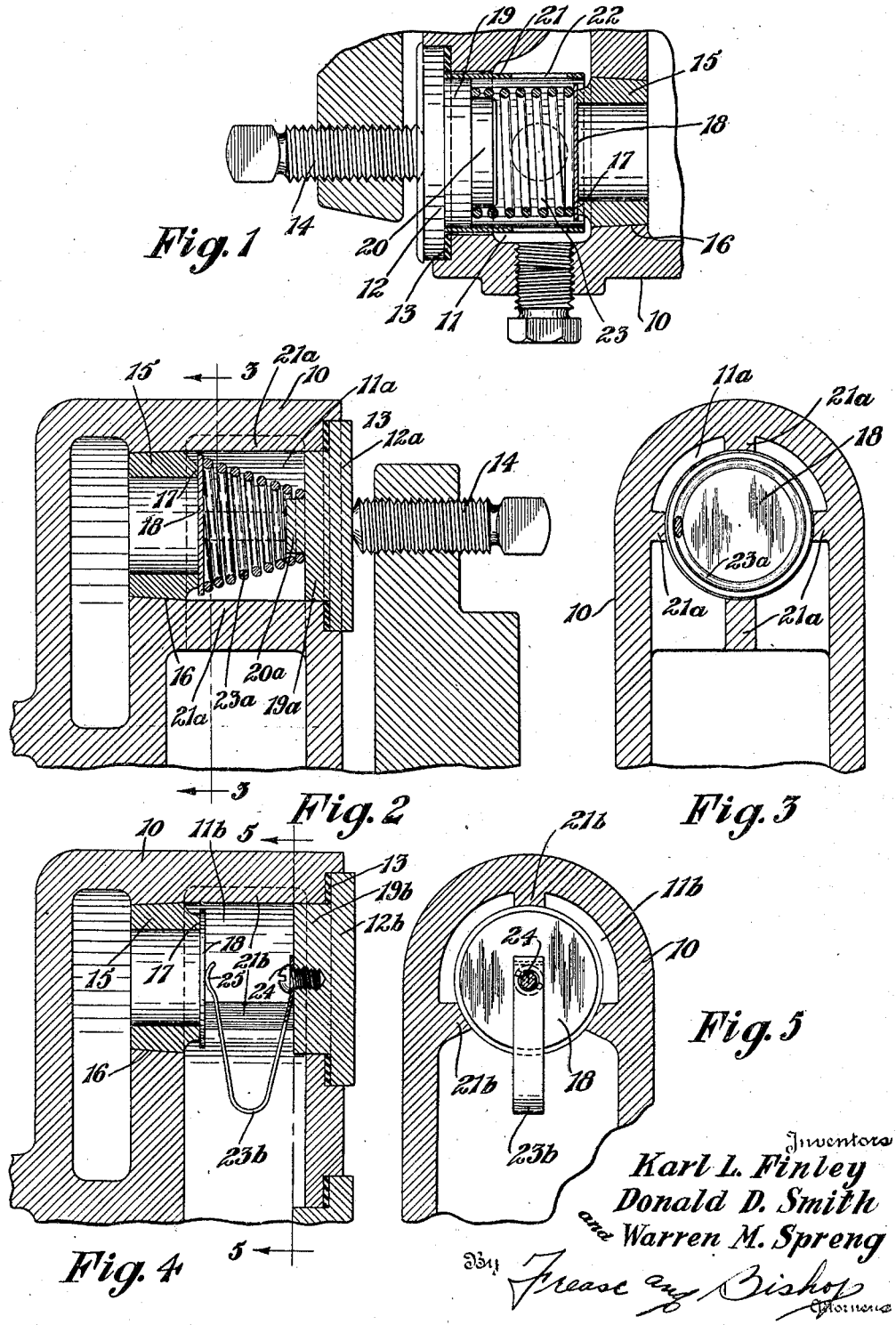

2,349,155

UNITED STATES PATENT OFFICE 2,349,155

FLAT DISK VALVE

Karl L. Finley, Donald D. Smith, and Warren M. Spreng, Ashland, Ohio, assignors to The F. E. Myers & Bro. Co., Ashland, Ohio, a corporation of Ohio Application May 13, 1942, Serial No. 442,784

4 Claims. (Cl. 251—119)

The invention relates to valves for use in pumps and similar apparatus, and more particularly to a spring loaded flexible, sheet metal, disk valve.

It is an object of the invention to provide a spring loaded, thin disk valve which will be more efficient, more rapid in action, quieter in operation and more economic in construction and operation, as compared with metal balls or other spring loaded valves now in use.

Another object is the provision of a valve of this character especially adapted for handling abrasive materials, such as plant and tree spray materials, lime, sulphur, copper sulphate, etc., where hardened ball valves are now commonly used.

A further object of the invention is to provide a hardened and ground valve seat, formed of stainless steel, bronze, monel metal or the like, which may be tapered on the outside to press fit into the cylinder body, or the like, and having a seating surface with which the disk valve co-operates.

A still further object is the provision of such a valve in which the overlapping diameter of the disk upon the seat permits variation of the position in which the valve seats at every operation, thus giving a longer life to the valve.

Still another object of the invention is to provide a thin gage, stainless steel, bronze or Monel metal disk stamped from sheet metal.

Another object is the provision of such a valve with a removable cap, gasketed to seal the opening in the cylinder body, or the like, and may be provided with a stop to limit the rise of the disk valve from the seat.

A further object is to provide a valve of this character with a spring which may be a coil spring of either cylindrical or conical form, or a flat spring either longitudinally curved or of hair pin form.

A still further object of the invention is the provision of guide means for guiding the movement of the valve within certain limits.

The above objects, together with others which will be apparent from the drawings and following description, or which may be later referred to, may be attained by constructing the improved valve in the manner illustrated in the accompanying drawings, in which Figure 1 is a longitudinal, sectional view through a valve constructed in accordance with the invention, in which a perforate sheet metal guide is used for guiding the valve within certain limits, and a cylindrical coil spring is provided for normally urging the disk valve against the seat;

Fig. 2, a similar view of a slightly modified form of the invention in which longitudinal guide ribs are formed on the walls of the valve chamber for guiding the disk within certain limits, and a conical, coil spring is provided for closing the valve.

Fig. 3, a transverse section taken as on the line 3—3, Fig. 2;

Fig. 4, a view, similar to Fig. 2 of another modification of the valve in which a flat spring, of hair pin type, is substituted for the coil spring;

Fig. 5, a transverse, sectional view, taken as on the line 5—5, Fig. 4;

Fig. 6, a view similar to Fig. 4, of a further modification of the valve in which a longitudinally curved, flat spring is used;

Fig. 7, a longitudinal section of another modified form of the valve in which a partly conical, coil spring is employed in combination with a vertically moving disk;

Fig. 8, a transverse section on the line 8—8, Fig. 7, and

Fig. 9, a longitudinal, sectional view of a still further modification in which a spring retainer is centrally attached to the disk.

Similar numerals refer to similar parts throughout the drawings.

A portion of the cylinder body of a pump is shown at 10, and is provided with a valve chamber 11, within which the improved valve is located, a cap 12 closing the outer end of said chamber.

The cap 12 seals the opening by means of a gasket 13, which is compressed between the opposed faces of the cap and cylinder body as by the screw 14.

At the opposite end of the valve chamber is located a valve seat 15, which may be formed of hardened and ground stainless steel, and is preferably tapered upon the outside, as shown in the drawings, so as to press fit into the tapered opening 16 in the cylinder body.

As illustrated, the seating surface 17 is ground flat and true, and is in the form of a narrow ring. This seating surface however may be made in various forms to meet various conditions, for instance it may be broad or narrow, conical, rounded, grooved or otherwise shaped. The flat seating surface shown in the drawing may be easily renewed by regrinding to a true flat, but other shapes of seats will be more difficult to grind.

The disk valve 18 is a thin gage stainless steel, bronze or Monel metal disk stamped from sheet metal, and is sufficiently flexible to permit it to conform to the shape of the seat 17 and form a perfect seal in cases where the seat is not an absolutely true plane surface.

This disk is of greater diameter than the seat, and since the disk is not rigidly guided in a definite path an advantage is gained in that the disk does not necessarily seat in exactly the same line at every operation, thus giving longer life to the disk.

Referring to Fig. 1, the cap 12 has a reduced boss 19 upon its inner side, upon which is formed a further reduced boss 20. A cylindrical, sheet metal guide 21 is fitted upon the larger boss 19 and extends to a point adjacent to the valve seat, and is provided with a plurality of large openings 22 to permit free flow of liquid through the same.

This guide is of larger internal diameter than the disk 18 so as to guide the disk within certain limits, while at the same time permitting sufficient play so that the disk is not required to travel in an exact path and no definite seating location of the disk is maintained.

For the purpose of normally urging the disk valve 18 toward the seat 17, a spring 23 of stainless steel, bronze or Monel metal is provided. As shown in Fig. 1, this spring may be a coil spring of cylindrical form, one end thereof being fitted around the reduced boss 20 of the cap 12, and the other end contacting the disk 18 and normally holding the disk in sealing contact with the seat.

As shown in Figs. 2 and 3, the valve chamber 11a may be provided with guide ribs 21a for guiding the valve disk within the desired limits. In this form of the invention the spring 23a may be a conical coil spring, the smaller end thereof fitting upon the reduced boss 20a of the cap 12a, while the larger end of the spring contacts the disk 18. The larger boss 19a upon the cap 12a fits within the open outer end of the valve chamber. Otherwise the structure shown in Figs. 2 and 3 may be the same as that previously described.

In the modification shown in Figs. 4 and 5, the valve chamber 11b is provided with guide ribs 21b, and the cap 12b has a single boss 19b fitting within the open outer end of the chamber. The spring may be in the form of a flat spring 23b, of hair pin, or U-shape, type, one leg thereof being attached to the cap as by a screw 24 and the other leg having a curved end portion 25 bearing against the central portion of the disk 18, for normally holding the disk seated upon the valve seat 17.

Another modification of the flat spring is shown in Fig. 6, in which all of the parts may be the same as illustrated and described in Figs. 4 and 5, except that the flat spring 23c is curved throughout its length, the lower end of the spring being attached to the cylinder body by a screw 24a and the upper end thereof being provided with a curved end 25a bearing against the central portion of the valve disk.

Figs. 7 and 8 show a modification of the invention in which the improved valve is shown as applied to a power spray pump, the disk being mounted in horizontal position.

The casting 26, in which the valve chamber 11d is formed, is shown attached to the lower end of the cylinder 27, which is fitted into a socket 28 in the casting, a centrally apertured disk plate 29 being located at the lower end of the cylinder, and gaskets 30 being provided upon opposite sides of said disk plate for sealing the joint.

A hardened and ground ring 15d is press fitted into a socket 16d in the lower end of the valve chamber and provided with the flat seating surface 17d against which the disk 18d is arranged to seat.

The spring 23d, which normally urges the disk against the seat, is a coil spring, the upper end of which may be conical, and bears against the disk plate 29, while the lower, smaller end thereof bears against the disk valve 18d. For the purpose of guiding the disk valve within certain limits, the guide ribs 21d are formed upon the interior of the valve body.

Another modification of the invention is shown in Fig. 9, in which the cap 12e is provided with an additional, reduced boss 31 which serves as a stop to limit the opening movement of the disk valve 18e.

This disk may be the same as above described except that it has a cup-shape, spring retainer 21e spot welded or otherwise connected to the central portion thereof for fitting within one end of the coil spring 23e, the other end of which fits over the boss 20e of the cap.

No guide means is provided in the valve chamber of this form of the invention, as the spring retainer 21e serves to guide the disk valve within necessary limits so that it will properly seat upon the valve seat 17. For the same reason this spring retainer is not necessary where the spring and disk are guided by a cage or guide ribs.

In practice the thin, disk valve disclosed herein has been found to operate at much higher rates of speed, with higher efficiency, and to show less wear, in a given time, than any other known valve, when passing highly abrasive materials.

In the operation of the valve, as the disk approaches the flat seat, the velocity of flow of the passing liquid toward the valve inlet becomes higher in the space between the disk and the seat, thereby reducing pressure in this space; while the pressure above the disk becomes more effective in causing the disk to seal against the seat, thus checking the flow of passing liquid.

The valve might be said to have a tendency to suck itself shut, and the pressure from above the valve holds it closed until the next surge of pressure from below the valve again opens it. A proper choice of materials for various conditions adds to the efficiency and life of the valve; for instance the use of hardened steel parts is desirable where abrasive or corrosive materials are present in the liquid passed through the valve.

Further, it has been found that because of the light weight of the disk combined with the spring on its discharge side, the disk is capable of a flutter like operation, thus permitting faster opening and closing of the disk valve than would be possible with a heavier valve, even though the heavier valve be spring loaded in the same manner.

Because of the overlapping diameter of the disk on the seat and the fact that the disk is not rigidly guided in a fixed path, the closing of the valve is not delayed since no definite seating location is necessary. In the case of a metal ball, or similar valve, the valve must strike absolutely true on the seat opening and must not rebound the least amount, to prevent loss in efficiency of the check. Longer life is also given to the valve because of this overlapping diameter of the disk on the seat, with no guide employed to rigidly hold the disk in a fixed path so that the disk does not necessarily seat in the same line at every operation.

Due to the light weight of the valve the impact is less, as compared with heavier metal valves used under high pressures, and consequently less wear results in longer life for the valve, and furthermore this light weight, disk valve is practically noiseless in operation, as compared with such heavier valves.

The flexibility of the thin metal disk permits it to readily conform to the shape of the seat and form a perfect seal, even though the seat is not made in an absolutely true plane surface, or has become worn out of its original shape.

By stamping the disk from thin gage sheet material, it is comparatively less expensive to produce than valves now in use.

Because of the light weight of the disk, the overlapping diameter of the disk on the seat and the spring load on the discharge side of the disk, the valve may be mounted in any position, vertical, horizontal or inverted, and is thus not limited to the customary vertical operation necessary with present known valves employed for similar uses, which is often inconvenient from a standpoint of design or service.

We claim:

1. In a valve for use in a spray pump, for handling abrasive spray solutions, a casing having a valve chamber therein provided with inlet and discharge ports, a circular valve seat surrounding the inlet port, a cap in the opposite end of the valve chamber and having a boss thereon, a smaller boss mounted on the first mentioned boss, a perforate guide cage mounted upon the first mentioned boss, a flexible, thin, sheet metal disk located within the guide cage for seating upon said seat and a coil spring having one end mounted upon the smaller boss and the other end contacting the disk for normally urging the disk into sealing contact with the seat, the diameter of the disk being substantially greater than the seat and substantially less than the cage, so that the disk may move laterally to seat freely at each operation.

2. In a valve for use in a spray pump, for handling abrasive spray solutions, a casing having a valve chamber therein provided with inlet and discharge ports, a circular valve seat surrounding the inlet port, a flexible, thin sheet metal disk located in the valve chamber for seating upon said seat, the diameter of the disk being substantially greater than the seat, a cap in the opposite end of the valve chamber and having a boss thereon extending into the chamber and a second boss of smaller diameter upon the first boss, a perforate guide cage within the chamber of substantially greater diameter than the disk, one end of the cage fitting upon the first boss, and a coil spring having one end fitting around the second boss and its other end contacting with the disk.

3. In a valve for use in a spray pump, for handling abrasive spray solutions, a casing having a valve chamber therein provided with inlet and discharge ports, a circular valve seat surrounding the inlet port, a flexible, thin sheet metal disk located in the valve chamber for seating upon said seat, the diameter of the disk being substantially greater than the seat, a cap in the opposite end of the valve chamber and having a boss thereon extending into the chamber and a second boss of smaller diameter upon the first boss, a screw rigidly mounted on the casing for contacting the outer side of the cap and holding it in position, a perforate sheet metal guide cage within the chamber of substantially greater diameter than the disk, one end of the cage fitting upon the first boss, and a coil spring having one end fitting around the second boss and its other end contacting with the disk.

4. In a valve for use in a spray pump for handling abrasive spray solutions, a casing having a valve chamber therein provided with inlet and discharge ports, a circular, tapered, press fitted, hardened steel valve seat surrounding the inlet port, a cap in the opposite end of the valve chamber and having a boss thereon, a smaller concentric boss mounted on the first named boss, a gasket between the cap and the adjacent end of the valve chamber, a screw threaded through a portion of the casing and engaging the outer side of the cap to compress said gasket, a perforate cylindric, sheet metal guide cage fitted around the first mentioned boss, a flexible, thin, sheet metal disk located within the guide cage for seating upon said valve seat and a coil spring having one end mounted around the smaller boss and the other end contacting the disk for normally urging the disk into sealing contact with the valve seat, the diameter of the disk being substantially greater than the valve seat and substantially less than the cage, so that the disk may move laterally to seat freely at each operation.

KARL L. FINLEY.
DONALD D. SMITH.
WARREN M. SPRENG.